United States Patent
Yeung (10) Patent No.: US 9,266,778 B2
(45) Date of Patent: Feb. 23, 2016

(54) MULTI-LAYER ACOUSTICAL PLASTER SYSTEM

(75) Inventor: Lee K. Yeung, Vernon Hills, IL (US)

(73) Assignee: USG Interiors, LLC, Chicago, IL (US)

(*) Notice: Subject to any disclaimer, the term of this patent is extended or adjusted under 35 U.S.C. 154(b) by 765 days.

(21) Appl. No.: 12/275,755

(22) Filed: Nov. 21, 2008

(65) Prior Publication Data

US 2010/0129643 A1    May 27, 2010

(51) Int. Cl.
| | |
|---|---|
| *C04B 28/02* | (2006.01) |
| *B32B 13/04* | (2006.01) |
| *C04B 26/02* | (2006.01) |
| *C04B 26/04* | (2006.01) |
| *C04B 26/28* | (2006.01) |
| *C04B 28/14* | (2006.01) |
| *G10K 11/162* | (2006.01) |
| *G10K 11/165* | (2006.01) |
| *G10K 11/168* | (2006.01) |
| *E04B 1/82* | (2006.01) |

(Continued)

(52) U.S. Cl.
CPC .............. *C04B 28/02* (2013.01); *B32B 13/04* (2013.01); *C04B 26/02* (2013.01); *C04B 26/045* (2013.01); *C04B 26/285* (2013.01); *C04B 28/145* (2013.01); *G10K 11/162* (2013.01); *B32B 2307/102* (2013.01); *C04B 2111/00568* (2013.01); *C04B 2111/00612* (2013.01); *C04B 2111/1006* (2013.01); *C04B 2111/28* (2013.01); *C04B 2111/52* (2013.01); *E04B 1/82* (2013.01); *E04B 1/8209* (2013.01); *E04B 2001/8263* (2013.01); *E04B 2001/8461* (2013.01); *G10K 11/165* (2013.01); *G10K 11/168* (2013.01); *Y02W 30/96* (2015.05); *Y02W 30/97* (2015.05); *Y10T 428/254* (2015.01)

(58) Field of Classification Search
CPC .............. E04B 1/74–1/90; E04B 1/99–1/994; E04B 1/8209; E04B 2001/8263; E04B 2001/8461; C04B 14/18; C04B 28/00–38/00; G10K 11/162–11/168; B32B 13/04; B32B 2307/102

See application file for complete search history.

(56) References Cited

U.S. PATENT DOCUMENTS

| 1,563,846 A | 12/1925 | Guastavino |
| 1,839,887 A | 1/1932 | New |

(Continued)

FOREIGN PATENT DOCUMENTS

| JP | H11-133980 | 5/1999 |
| JP | 2000-001380 | 1/2000 |

OTHER PUBLICATIONS

Green, ed., Perry's Chemical Engineers Handbook, 7th ed., Table 19-6, p. 19-20 (1997).*

(Continued)

*Primary Examiner* — Scott R Walshon
(74) *Attorney, Agent, or Firm* — Greer, Burns & Crain, Ltd.; Brian Wishnow; Philip T. Petti (57) ABSTRACT

An acoustical plaster system features a base layer mixture and a finish layer mixture. The base layer mixture includes a first binder, a first thickener and a plurality of first particles, with the first particles being porous, lightweight, non-close packing particles having a first mean diameter. The finish layer mixture includes a powder latex binder, a second thickener and a plurality of second particles, with the second particles being porous, lightweight particles having a second diameter. The first mean diameter is larger than said second mean diameter.

16 Claims, 3 Drawing Sheets

(51) Int. Cl.
    *E04B 1/84*     (2006.01)
    *C04B 111/00*   (2006.01)
    *C04B 111/10*   (2006.01)
    *C04B 111/28*   (2006.01)
    *C04B 111/52*   (2006.01)

(56) References Cited

U.S. PATENT DOCUMENTS

| | | | |
|---|---|---|---|
| 1,937,011 A | | 11/1933 | Eaton |
| 1,971,900 A | | 8/1934 | Cerveny et al. |
| 1,983,022 A | | 12/1934 | Eaton |
| 2,037,995 A | | 4/1936 | New |
| 2,037,996 A | | 4/1936 | New |
| 2,580,076 A | * | 12/1951 | Deane ............... 523/218 |
| 2,993,016 A | * | 7/1961 | Sucetti ............... 524/2 |
| 3,952,830 A | * | 4/1976 | Oshida et al. ......... 181/294 |
| 4,238,914 A | * | 12/1980 | Omholt ............... 52/309.3 |
| 4,265,964 A | * | 5/1981 | Burkhart ............. 428/313.5 |
| 4,746,365 A | * | 5/1988 | Babcock et al. ....... 524/4 |
| 5,013,405 A | * | 5/1991 | Izard ................. 162/101 |
| 5,395,438 A | | 3/1995 | Baig et al. |
| 5,779,786 A | * | 7/1998 | Patel ................. 106/781 |
| 5,888,626 A | * | 3/1999 | Sensenig ............. 428/206 |
| 6,030,673 A | * | 2/2000 | Andersen et al. ...... 428/36.4 |
| 6,319,312 B1 | | 11/2001 | Luongo |
| 6,342,284 B1 | * | 1/2002 | Yu et al. ............. 428/70 |
| 6,379,454 B1 | | 4/2002 | Fellert |
| 6,391,958 B1 | * | 5/2002 | Luongo ............... 524/423 |
| 6,443,256 B1 | * | 9/2002 | Baig ................. 181/286 |
| 6,476,099 B1 | * | 11/2002 | Cimaglio et al. ...... 523/218 |
| 6,675,551 B1 | | 1/2004 | Fuchs |
| 6,923,248 B1 | | 8/2005 | Weber et al. |
| 6,936,099 B2 | | 8/2005 | Ayambem |
| 7,364,015 B2 | * | 4/2008 | Englert et al. ....... 181/296 |
| 8,057,915 B2 | * | 11/2011 | Song ................. B28B 19/0092 106/698 |
| 8,172,938 B2 | * | 5/2012 | Alright et al. ....... 106/672 |
| 2002/0170467 A1 | * | 11/2002 | Naji et al. .......... 106/705 |
| 2004/0231916 A1 | * | 11/2004 | Englert et al. ....... 181/296 |
| 2007/0112145 A1 | * | 5/2007 | Ando et al. .......... 525/476 |
| 2009/0004459 A1 | * | 1/2009 | Kipp et al. .......... 428/318.4 |
| 2009/0239429 A1 | * | 9/2009 | Kipp et al. .......... 442/1 |
| 2010/0129643 A1 | | 5/2010 | Yeung |

OTHER PUBLICATIONS

Translation of Office Action in related Japanese Patent Application No. 2011-537615.
Malaysian Office Action from corresponding Malaysian Patent Application No. PI 2011002203, mailed Dec. 15, 2015.

* cited by examiner

MULTI-LAYER ACOUSTICAL PLASTER SYSTEM

BACKGROUND

Trends to reduce noise pollution and provide quiet interior spaces encourage the use of sound reducing materials, creating a growing market for acoustical building materials. However, there is also a desire for an aesthetically pleasing finish, since at least one surface of the sound reducing material is visible from inhabited areas.

Traditional plaster has a smooth monolithic appearance that is considered to be a model surface. It accepts a variety of decorative finishes, such as paint, wallpaper, and the new faux finishes. However, the plaster also reflects sound, thereby increasing noise pollution. Some sound frequencies are also distorted, making the reflected sounds even less desirable.

Conventional acoustical panels are well-suited for absorbing sounds. The surface of the panel is treated to provide openings into which sounds penetrate. For example, the panel may be needled, that is, it is punctured with rows of needles that create pores in the panel surface. When combined with a porous panel structure, the sounds enter the needle voids and pass into the panel pores. As the sounds reflect off the walls of the voids or pores, a portion of the sound is absorbed. This results in little or no sound exiting the panel. However, the aesthetics of the panels are not widely accepted and consumers are looking for an acoustical panel without visible holes or fissures.

There are other acoustical systems commercially available that deliver both an aesthetically pleasing finish and sound attenuation. However, the systems require fixing of a specialty fiberglass mat to the substrate with an adhesive, treatment of the joints and application of a finish-coat plaster by hand. Thus, these systems have several disadvantages. The specialty fiberglass panel must be purchased and transported to the job site without damage. A large number of specialty supplies are needed, including the panel, adhesive and at least two types of acoustical plaster. At least four time-consuming steps are needed for installation of the panel, such as preparing the panel, adhering the panel, treating the joints and applying the plaster.

Thus, it would be advantageous to design a system for finishing a substrate that provides both improved sound absorbency and an aesthetically pleasing surface.

SUMMARY OF THE INVENTION

One or more advantages of the present invention will be clear to one skilled in the art. Specifically, the present acoustical plaster system features a base layer mixture and a finish layer mixture. The base layer mixture includes a first binder, a first thickener and a plurality of first particles, with the first particles being porous, lightweight, non-close packing particles having a first mean diameter. The finish layer mixture includes a latex binder, a second thickener and a plurality of second particles, with the second particles being porous, lightweight particles having a second diameter. The first mean diameter is larger than said second mean diameter.

This plaster system has several advantages over the prior art. There is no need to purchase, transport and install a fiberglass panel over an existing substrate. Using the present system, no panel is necessary at all. If a panel is used, conventional, low-cost sound absorbing panels, such as a mineral wool fiber panels, are suitable.

Use of the present system reduces the number and amount of supplies that must be transported to the job site. Only two packages, one of the base layer mixture and one of the finishing layer mixture, need be taken to the building area. At least the adhesive and panel can be omitted from the list of supplies that are needed. Optionally, the materials can be premixed with water at the production plant, further reducing jobsite mixing preparations allowing the applicator to use the product directly out of the packaging without the need to bring water onto the jobsite to mix the product.

Additionally, the present acoustical plaster system requires fewer steps to install it. There is no panel to install and no joints to finish. Installation includes applying the base layer mixture, then applying the finish layer mixture when the base layer has hardened. The hardened acoustical plaster system has a plaster-like finish. Sound passes through the acoustically transparent finish layer, then is absorbed into the base layer. Little or no sound is reflected back into the room.

DETAILED DESCRIPTION OF THE INVENTION

A plaster system includes a base layer mixture and a finish layer mixture. It is contemplated that the acoustical plaster system could be formulated with additional layers to optimize the acoustics for specific applications.

The base layer mixture is applied to a substrate. Although the base layer is optionally applied to a panel, the base layer is advantageously applied where the substrate includes no underlying panel. Examples of suitable substrates include wood, metal, cast concrete, brick, wood or cellulosic particle composite boards, cementitious boards, or paper-faced mineral panels.

The base layer is a sound absorbent layer. It includes a system of interconnecting pores that extend throughout the thickness of the base layer. Sounds are partially absorbed by the base layer and partially reflected. The system of pores makes it likely that a sound entering a pore is reflected within the pore system until it is fully absorbed. This ensures that few sounds are either reflected back into the room from which they came or transmitted through to adjoining rooms.

Increasing the thickness of the base layer increases the sound absorbency. A thicker base layer effectively increases the torturous pathway available to dissipate a soundwave which enters the material. Thus, the thickness of the base layer can be selected, at least in part, by the desired degree of acoustical absorbency. The base layer is at least 0.5 inch (1.3 cm) in thickness in some embodiments. In some preferred embodiments, the base layer thickness is about from 1 inch (2.5 cm) to about 2 inches (5 cm). It should be noted that to obtain thicker base layers may require multiple applications of the base layer material.

A primary component of the base layer mixture is a plurality of first particles. The first particles are porous, lightweight, non-close packing particles. Porous is defined as a material with a large amount of interior void-space, typically from 8 to 45%. Lightweight means a material having a density less than 0.3 g/cm$^3$. Non-close packing particles are those that leave spaces between at least some particle faces to create inter-particle pores. Preferably, a system of interconnecting pores will be created for sound management. Examples of first particles include expanded perlite, coated expanded perlite, glass microspheres, resin microspheres, blown glass beads, gas-filled resin spheres, polystyrene particles, gas-filled inorganic spheres, hollow or porous inorganic beads, polybutadiene particles, rubber particles, elastomeric particles and combinations thereof. At least a portion of the first particles are preferably inorganic particles to maintain fire-resistance in the base layer. If organic particles are used, appropriate flame resistant additives are preferably incorporated into the formulation.

The first particles are relatively large. Preferably, they have a first mean diameter of at least about 1000 microns. In some embodiments, at least 85% of the first particles by volume have a first mean diameter of about 1000 microns to about 5000 microns. The amounts of the first particles range from about 3% to about 80% based on the weight of the dry base layer mixture and depending on if there is a hydraulic component.

Another component of the base layer mixture is a first binder. Any typical adhesive binder is useful in the base layer mixture. Starch and synthetic polymer binders, such as polyvinyl alcohol and boric acid, homo and co polymers of polyvinyl acrylate, polyvinyl acetate and polyurethane emulsion latexes are examples of useful binders. Liquid emulsions are used if a ready-mixed base layer mixture is desirable. Alternatively, spray-dried powders of the corresponding emulsions can be used if a dry-mix formulation is desired. The first binder is used in amounts of from about 1 to about 15% based on the total weight of the dry base layer mixture components or from about 2 to 20% based on the total weight of a ready-mixed wet formulation.

The base layer mixture optionally includes a hydraulic component, such as calcined gypsum. Many forms of calcined gypsum are useful, including alpha and beta calcined forms. Either natural or synthetic gypsums can be used. Other suitable hydraulic components include Portland cement, variations such as Portland flyash cement and masonary cements. Some preferred embodiments of the base layer mixture are free of hydraulic components. A preferred hydraulic component is beta calcium sulphate hemihydrate. When present, about 10 to about 40% of the weight of the dry base layer mixture is the hydraulic component. Optionally, set accelerators familiar to those skilled in the art can be used, examples include calcium sulphate hemihydrate in Portland cement formulations and alum in calcium sulfate hemihydrate plaster formulations.

At least one thickener is used in the base layer mixture to increase the viscosity of the aqueous base layer mixture sufficiently that it does not run or drip from the substrate prior to hardening, makes the material easier to apply and can act as an air entrainment agent to further reduce the weight of the wet material and produce more pores per volume in the dried material. Cellulosic thickeners are preferred thickeners. Examples of suitable thickeners include modified cellulosics such as the BERMOCOLL® products (Akzo Nobel, Stenungsund, Sweden) and METHOCELO and CELLOSIZE® products (Dow Wolff Cellulosics, USA/Germany). They are optionally used in amounts of about 2 to about 8% based on the weight of the dry base layer mixture. Optionally, inorganic extenders such clays as bentonite or attapulgite or ultrafine ground calcium carbonate can be used to further modify the rheology to facilitate application.

It is contemplated that the first thickener be either a single thickener or a package of thickening components. Thickening and foaming are often related. Many thickeners are foaming agents that entrain air during mixing. A balance must be achieved between the rheological properties of the base material and the amount of foam produced. Although it is preferable to find a single thickener that produces the optimum balance, one skilled in the art would also know that a particular combination of thickness and foam is also achievable by combining one or more thickeners with foaming agents or defoaming agents.

Optionally, the base layer mixture includes acoustically absorbent fibers. Such fibers are well-known for sound-absorption and include, for example, mineral wool fibers, cotton fibers, fiber glass, cellulosic fibers and combinations thereof. The fibers are used in amounts of from about 1 to about 70% based on the weight of the dry base layer mixture.

The finish layer mixture produces a finish layer that hardens to a smooth monolithic surface. It is applied to the base layer by any known means, including spraying and hand troweling. The finish layer mixture generally includes a second binder, a second thickener package and the second particles.

The second binder for the finish layer is preferably a starch or synthetic polymer binders such as polyvinyl alcohol and boric acid, homo and co polymers of polyvinyl acrylate, polyvinyl acetate and polyurethane emulsion latexes. Alternatively, spray-dried powders of the corresponding emulsions can be used if a dry-mix formulation is desired. Liquid emulsions are used if a ready-mixed base layer mixture is desirable. The powder latex is used in amounts of about 1% to about 15% by weight of the dry finish layer mixture. Since the pores of the finish layer are smaller than those of the base layer, use of binders that clog the pores may not be suitable when smaller pores are produced.

Also included in the finish layer mixture is a second thickener. As with the first thickener, cellulosic thickeners are preferred and inorganic extenders can optionally be used. The second thickener is used in amounts of from about 8 to about 20% by weight of the dry finish layer mixture. As discussed above with respect to the first thickener, it is contemplated that the second thickener be either a single thickener or a package of thickening components. The second thickener can be the same or different from the first thickener.

One component of the finish layer is a plurality of second particles. The second particles are porous, lightweight particles as these terms are defined above, but having a second mean diameter that is smaller than the first mean diameter. In some preferred embodiments, the second mean diameter is from about 100 microns to about 500 microns. Use of smaller diameter particles allows the finish to appear smoother than the base layer mixture while maintaining an overall porous structures that allows soundwave to pass through and be absorbed by the base layer. Depending on if there is a hydraulic component, the amounts of the second particles range from about 3% to about 80% based on the weight of the dry base layer mixture.

The same types of particles that are suggested for use as the first particles are also useful as the second particles. However, the first mean particle diameter is larger than the second mean particle diameter. Amounts of the second particle range from about 50% to about 80% based on the weight of the dry finish layer mixture.

As with the base layer mixture, optionally the finish layer mixture includes a hydraulic component as described above. When present, about 10 to about 40% of the weight of the dry finish layer mixture is the hydraulic component.

As described above, the base layer mixture and the finish layer mixture can be prepared as dry mixtures. They can each be packaged separately for use at a job site where the water is added just prior to use. It is also contemplated that a package of the dry base layer mixture and a package of the finish layer mixture be sold together as a kit for improving sound absorption of a substrate. Preferably, the ratio of the base layer mixture to the finish layer mixture is from about 1:0.1 to about 1:0.25.

The water to be added should be as pure as practical. If hydraulic components are present, some aqueous impurities can interact with the hydraulic components of either the base layer mixture or finish layer mixture to produce unwanted results. For example, salts present in the water can act as a set retarder or set accelerator for the optional calcined gypsum, changing the amount of time when the plaster is workable leading to difficulties in application. Once applied, the material may set at different rates and cause dryout or cracking issues. In some embodiments, water is added to the base layer mixture in ratios of from about 2:1 to about 4:1 by weight. The ratio of water to the finish layer mixture in other embodiments is from about 4:1 to about 6:1 by weight.

Another option is the preparation of the base layer mixture and/or the finish layer mixture in a form that is ready to use. It will remain workable as long as the water does not evaporate. If a hydraulic component is present in the formulation, the set mechanism can be deactivated according to U.S. Pat. No. 6,805,741 B1 and U.S. Ser. No. 12/107,382, filed Apr. 22, 2008, hereby incorporated by reference. Once the material is ready to use, a suitable activator described in the prior art can be utilized.

When a ready-mixed formula is prepared, it is also advantageous to add a preservative to prevent growth of microbes. Without the addition of a biocide, microbes that are present in the base layer mixture or the finish layer mixture from the water or the air can flourish where there is moisture and organic particles for food. Use of such a biocide is known to an artisan. Examples of useful biocides include pyrithione salts, boric acid, diiodotolusulfone and other known preservatives. The biocide is normally used in amounts of less than 1% based on the wet mixture.

The acoustical plaster system is prepared by a number of methods. To prepare the dry base layer mixture, all of the desired components described above, including the binder, the first thickener, and the plurality of first particles, are acquired in a dry form. After measuring each of the components to obtain appropriate amounts, the components are dry blended until a homogeneous mixture is achieved. If the base layer mixture is not intended for immediate use, it is optionally packaged to keep it dry. The dry finish layer mixture is prepared separate from the base layer mixture but in a similar manner using the powder binder, the second thickener, and the plurality of second particles.

If the base layer mixture and the finish layer mixture are supplied as dry mixtures, water is added prior to application of the layers. A first portion of water is first added to the base layer mixture. A sufficient amount of water is added to the base layer mixture so that it adheres to the substrate. The amount of water used in the first portion of water may depend on the method of application of the base layer mixture. If the base layer mixture is sprayed onto the substrate, a thinner mixture may be advantageous, requiring a larger amount of water. In some embodiments, the first portion of water is used in amounts of from about 30% to about 85% by weight of the final wet formulation.

The base layer mixture is applied to the substrate by any suitable means. In some embodiments, the base layer mixture is applied to the substrate by spraying or by using a trowel. If a smooth, monolithic surface is desired, the surface of the base layer is optionally smoothed with a trowel. Although it is beneficial to smooth the base layer to approximately a constant thickness, small surface imperfections can be ignored as they will be covered by the finish layer. After application of the base layer mixture, it is allowed to dry or harden until dry to the touch or approximately 12 hours to form the base layer. The exact drying time will be effected by ambient temperature and humidity as well as the thickness of the material applied.

Preparation of the finish layer mixture for application to the base layer proceeds similarly. After preparing or obtaining the finish layer mixture, the second portion of water is added to make a wet mixture. As with the base layer mixture, the amount of water in the second portion of water may vary with the method of application. In some embodiments, the second portion of water ranges from about 30% to about 85% based on the final wet finish layer mixture. If the finish layer mixture includes the optional hydraulic component, it should be noted that the addition of water to the dry finish layer mixture can initiate hydration reactions. Sufficient time should be allowed between water addition and application of the finish layer before it hardens.

As with the base layer mixture, the finish layer mixture is applied using any suitable method, including spraying and troweling. After application, the finish layer mixture is optionally finished to produce the desired surface, such as a smooth, monolithic surface. Floating and troweling are preferred methods of finishing the finish layer mixture. After finishing the finish layer mixture it is allowed to harden. The finish layer mixture hardens at least partially by drying. If the optional hydraulic component is present, hydration of the hydraulic component also contributes to hardening of the finish layer mixture. The surface of the final finish can be further smoothed by sanding with conventional sanding tools used in joint compound wall finishing procedures.

If either of the base layer or finish layer mixtures are provided in a ready-mixed form containing water, the product is used directly out of the container. Some settling may occur during transport and storage prior to use, so the product is first stirred and mixed to a homogeneous state. If a deactivated hydraulic component is present, an activator is added along with the stirring. The material is then applied in a manner similar to the dry mixture form after the addition of water.

When the base layer mixture is applied to an inverted surface that is hard, for example gypsum board panels, it may be advantageous to spread a cushion layer on the substrate between it and the base layer mixture. The cushion layer is a material that is pliable as it is applied, although it optionally cures to form a hard layer after application of the base layer mixture. Another property of the cushion layer is that it provides additional adhesion of the base layer mixture to the substrate. Examples of a suitable cushion layer include a thick (preferably 90,000-210,000 cps) adhesive, such as a tile mastic adhesive, cementitious mortars, curable viscoelastic material such as RTV rubber and sealants. Examples of the cushion layer include USG DUROCK™ High Performance Tile Mastic, USG DUROCK™ Latex Modified Fast-set High Performance Mortar and USG brand Acoustical Sealant. The cushion layer is particularly useful for base layer mixtures having particles greater than 1 mm. Without the cushion layer, base layer mixtures having large aggregates are difficult to apply to a hard, inverted substrate. The base layer mixture is spread to the cushion layer prior to hardening, curing or setting of the cushion layer.

Example 1

A ready-mixed base layer mixture formulation was prepared using the components listed in Table 1. The dry components were mixed in a V-shell dry blender for 5 minutes, then added to the pre-mixed liquid components. All materials were then mixed in a Hobart mixer equipped with paddles at about 60 RPM for 10-15 minutes.

TABLE I

| Component | Function | Amount | Weight Percent |
|---|---|---|---|
| BERMOCOLL 481FQ | Thickener | <4.4 g | 0.8% |
| HP 42-296 | Latex Emulsion | 40 g | 7.7% |
| Galactosol | Thickener | 2 g | 0.4% |
| Perlite #5 | inorganic aggregate | 112 g | 21.7% |
| Water | Solvent | 360 g | 69.4% |

The base layer mixture was applied onto 10"×7" inch gypsum wallboard panels which had previously been coated with a cushion layer using a ¼" notched trowel. When applied inverted to the panels, the base layer mixture remained cohesive and did not droop, sag or detach from the substrate.

Example 2

A dry base layer mixture formulation is prepared using the components listed in Table II. The dry components are mixed in a V-shell dry mixer for 5 about minutes to form a dry powder mixture.

TABLE II

| Component | Function | Amount | Weight Percent |
|---|---|---|---|
| BERMOCOLL 481FQ | thickener | 60 g | 4.1% |
| VINNAPAS 7037T | redispersible latex powder | 300 g | 20.3% |
| Perlite #5 | inorganic aggregate | 1120 g | 75.6% |

At the jobsite, 3800 g of water is added to the dry powder mixture created above immediately prior to use. Stirring is supplied by a common drill mixer equipped with a paddle.

Example 3

A dry base layer mixture formulation is prepared using the components listed in Table III. The dry components are mixed in a V-shell dry mixer for 5 about minutes to form a dry powder mixture.

TABLE III

| Component | Function | Amount | Weight Percent |
|---|---|---|---|
| BERMOCOLL 481FQ | thickener | 60 g | 3.1% |
| VINNAPAS 7037T | redispersible latex powder | 300 g | 15.7% |
| Perlite #5 | inorganic aggregate | 1120 g | 58.5% |
| Calcium Sulfate hemihydrate | Cementious binder | 435 g | 22.7% |

At the jobsite, 4500 g of water is added to the dry powder mixture created above immediately prior to use. Stirring is supplied by a common drill mixer equipped with a paddle.

Example 4

A ready-mix finish layer mixture formulation was prepared using the components listed in Table IV. The dry components were mixed in a V-shell dry mixer for 5 about minutes to form a dry powder mixture, then added to the pre-mixed liquid components. All materials were then mixed in a Hobart mixer equipped with paddles at about 60 RPM for 10-15 minutes.

TABLE IV

| Component | Function | Amount | Weight Percent |
|---|---|---|---|
| SuperGelB | thickener | 40.4 g | 3.2% |
| DCS | thickener | 6.8 g | 0.5% |
| STARPOL 163 | thickener | 2 g | 0.1% |
| AIRFLEX 3540 | latex emulsion | 54 g | 4.3% |
| Water | solvent | 994.3 g | 78.5% |
| Perlite #9 | inorganic aggregate | 169.3 g | 13.4% |

The finish layer mixture was applied to a cured basecoat layer which previously had been applied onto a 10"×7" inch gypsum wallboard panel coated with a cushion layer using a ¼" notched trowel. The finish layer mixture was smooth and had moderately good application feel.

Example 5

A dry finish layer mixture formulation was prepared using the components listed in Table V. The dry components were mixed in a V-shell dry mixer for 5 about minutes to form a dry powder mixture.

TABLE V

| Component | Function | Amount | Weight Percent |
|---|---|---|---|
| SuperGelB | thickener | 28.4 g | 13.1% |
| DCS | thickener | 6.8 g | 3.0% |
| STARPOL 163 | thickener | 4 g | 1.8% |
| VINNAPAS 7037T | redispersible latex powder | 25.7 g | 11.4% |
| Perlite #39 | inorganic aggregate | 160 g | 71.1% |

At the jobsite, 994.3 g of water was added to the dry powder mixture created above immediately prior to use. Stirring was supplied by a common drill mixer equipped with a paddle. When applied to a substrate to evaluate the look, this finish layer mixture was found to have moderate application feel but be slightly runny. When dry, the coating was smooth.

Example 6

A dry finish layer mixture formulation is prepared using the components listed in Table VI. The dry components are mixed in a V-shell dry mixer for 5 about minutes to form a dry powder mixture.

TABLE VI

| Component | Function | Amount | Weight Percent |
|---|---|---|---|
| SuperGelB | thickener | 300 g | 14% |
| DCS | thickener | 55 g | 2.8% |
| STARPOL 163 | thickener | 43 g | 2.2% |
| VINNAPAS 7037T | redispersible latex powder | 257 g | 12.9% |
| Perlite #3-S | inorganic aggregate | 1021 g | 51.2% |
| Calcium Sulfate hemihydrate | cementious binder | 320 g | 16.0% |

At the jobsite, 10 kg of water is added to the dry powder mixture created above immediately prior to use. Stirring is supplied by a common drill mixer equipped with a paddle.

Example 7

A base layer mixture formulation was prepared using the components of Table VII. The dry components are mixed in a V-shell dry mixer for 5 about minutes to form a dry powder mixture. Water was then added to the dry components to make a paste.

TABLE VII

| Component | Function | Amount | Weight Percent |
|---|---|---|---|
| Water | solvent | 90 g | 69.7% |
| Bermocoll 481 FQ | thickener | 1.1 g | 0.9% |
| Supercote | Acrylic Latex Emulsion | 10 g | 7.7% |
| Perlite #5 | Inorganic aggregate | 28 g | 21.7% |

Figure 1:
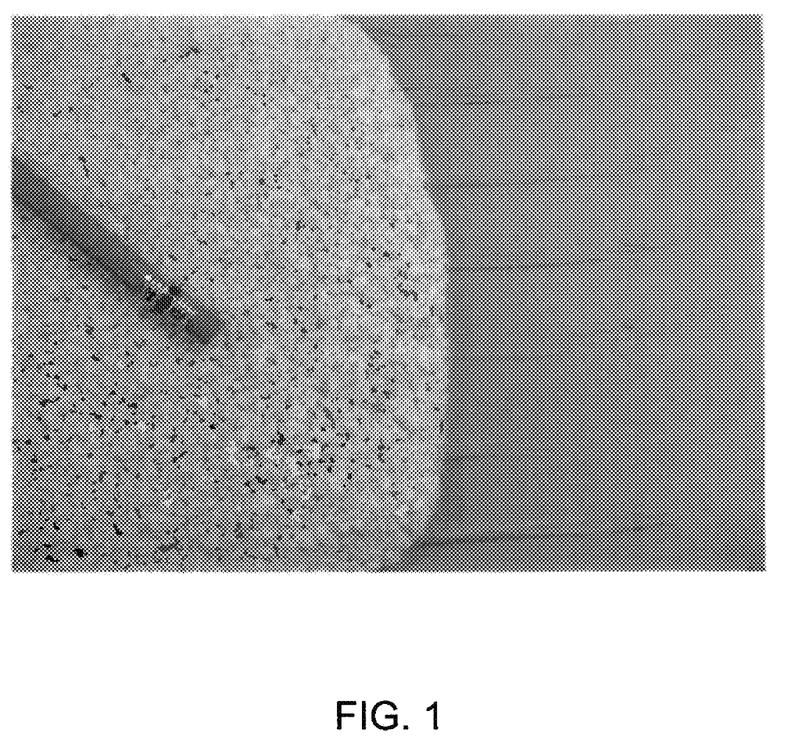
FIG. 1 is a photograph of a base layer mixture applied to a cushion layer on a substrate.

Prior to installation of the prepared base layer mixture, a cushion layer about ¼ to about ½ inch in thickness (6-12 mm) of USG DUROCK™ High Performance Tile Mastic was applied to a substrate. While the cushion layer was still pliable, the base layer mixture was applied to the surface of the cushion layer, as shown in FIG. 1.

Example 8

A finish layer mixture was prepared from the components of Table VIII.

TABLE VIII

| Component | Function | Amount | Weight Percent |
|---|---|---|---|
| Water | solvent | 1988.6 g | 79.1% |
| SuperGelB | thickener | 56.8 | 2.3% |
| DCS | thickener | 13.6 | 0.5% |
| Starpol 163 | thickener | 8.2 g | 0.3% |
| HP 41-830 | latex powder | 108 g | 4.3% |
| Ryolex 39 Perlite | aggregate | 338.6 g | 13.5% |

Figure 2:
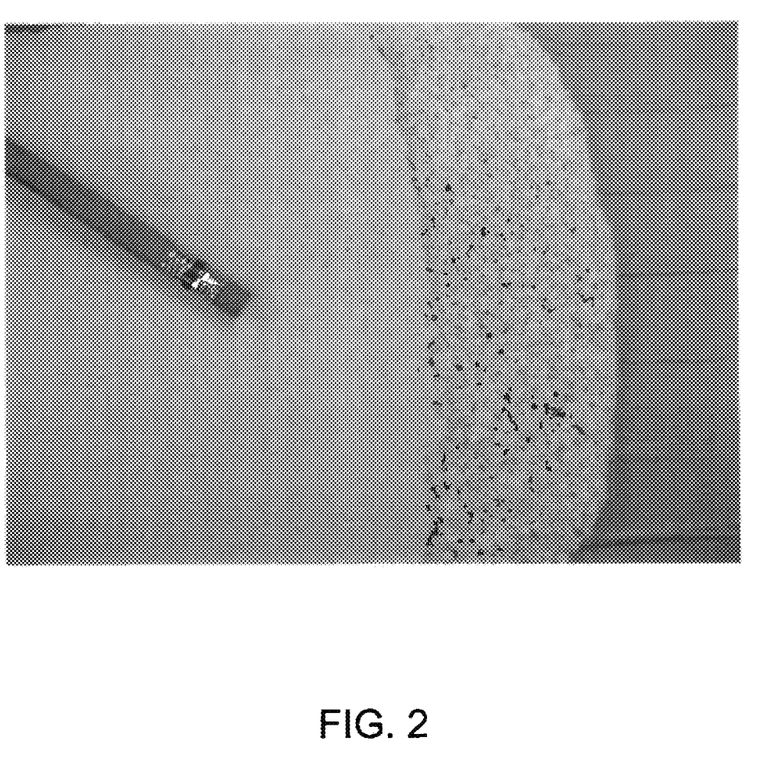
FIG. 2 is a photograph of the plaster system showing a finish layer mixture applied to a base layer mixture on a cushion layer.
Figure 3:
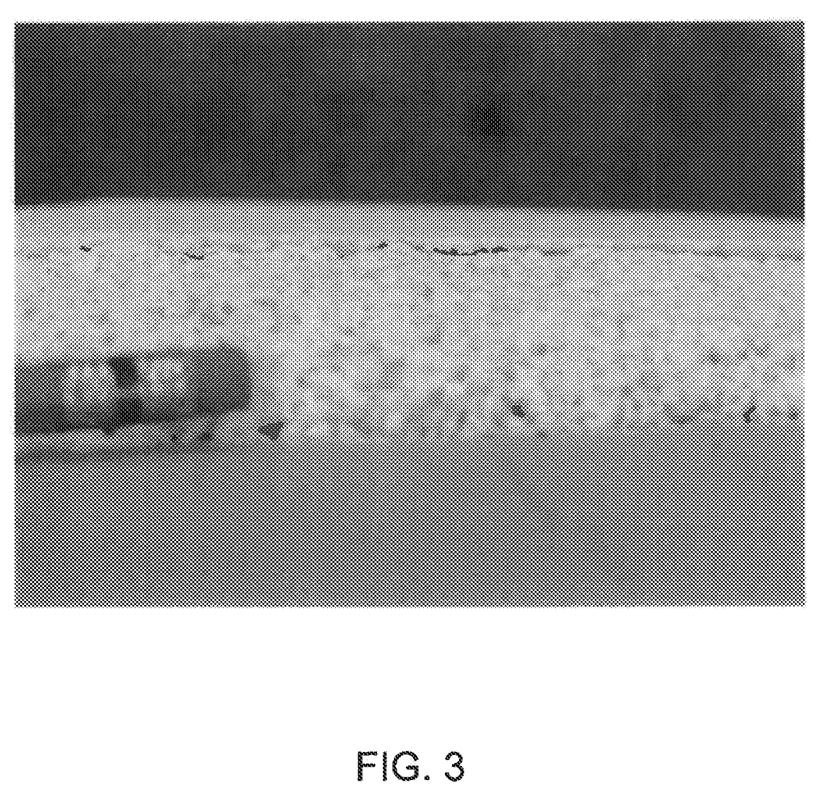
FIG. 3 is a photograph of a cross section of the plaster system of FIG. 2 showing the relative thicknesses of the layers.

After curing of the base layer mixture of Example 7, the finish layer mixture was applied to the exposed surface of the base layer mixture. FIG. 2 shows a top view of the finish layer, base layer mixture and cushion layer, while a cross section of the finish layer mixture, base layer mixture and cushion layer system is shown in FIG. 3.

While a particular embodiment of the multi-layer acoustical plaster system has been shown and described, it will be appreciated by those skilled in the art that changes and modifications may be made thereto without departing from the invention in its broader aspects and as set forth in the following claims.

What is claimed is:

1. An acoustical system to be applied to a substrate, comprising:
a base layer mixture that adheres to the substrate, consisting of a first binder, a first thickener and a plurality of first particles, and optionally acoustically absorbent fibers and water, wherein said first particles consist of porous, lightweight, non-close packing particles having a first mean diameter, wherein said first mean diameter is from about 1000 microns to about 5000 microns, and wherein the amount of said first particles in the base layer mixture is from 8 to 45%, wherein the first particles are selected from the group consisting of expanded perlite, coated expanded perlite, glass microspheres, resin microspheres, blown glass beads, gas-filled resin spheres, polystyrene particles, gas-filled inorganic spheres, hollow or porous inorganic beads, polybutadiene particles, rubber particles, elastomeric particles and combinations thereof; and
a finish layer mixture that adheres to said base layer mixture, said finish layer consisting of a powder latex binder, a second thickener and a plurality of second particles, and optionally a hydraulic component, water and a set retarder, wherein said second particles consist of porous, lightweight particles having a second mean diameter, wherein said first mean diameter is larger than said second mean diameter, wherein said second mean diameter is from about 100 microns to about 500 microns and wherein the amount of said second particles in the finish layer mixture is from 50% to 80%, and wherein the second particles are selected from the group consisting of expanded perlite, coated expanded perlite, glass microspheres, resin microspheres, blown glass beads, gas-filled resin spheres, polystyrene particles, gas-filled inorganic spheres, hollow or porous inorganic beads, polybutadiene particles, rubber particles, elastomeric particles and combinations thereof.

2. The system of claim 1 wherein said first particles and said second particles are selected from the group consisting of expanded perlite, coated expanded perlite, glass microspheres, resin microspheres, blown glass beads, gas-filled resin spheres, polystyrene particles, hollow or porous ceramic beads, polybutadiene particles, rubber particles and combinations thereof.

3. The system of claim 1 wherein said base layer mixture includes the acoustically absorbent fibers.

4. The system of claim 3 wherein said acoustically absorbent fibers comprise at least one of the group consisting of mineral wool, cotton, fiberglass, wood pulp and combinations thereof.

5. The system of claim 1 wherein said finish layer mixture includes the hydraulic component.

6. The system of claim 5 wherein said hydraulic component comprises calcined gypsum.

7. The system of claim 5 wherein said finish layer mixture includes water and the set retarder.

8. The system of claim 1 wherein each of said base layer mixture and said finish layer mixture includes water.

9. The system of claim 1 further comprising a cushion layer that adheres to the substrate and to which said base layer mixture adheres.

10. The system of claim 9, wherein said cushion layer is selected from the group consisting of a mastic, an adhesive, a viscoelastic and a setting type cementitious material, said cushion layer having a viscosity of between 90,000 to 210,000 cps at room temperature.

11. The acoustical system of claim 1, wherein the substrate is selected from the group consisting of wood, metal, cast concrete, brick, wood boards, cellulosic particle composite boards, cementitious boards and paper-faced mineral panels.

12. A method of using the acoustical system of claim 1, the method comprising:
a) applying the base layer mixture of claim 1 to a substrate;
b) allowing said base layer mixture to harden to form a base layer;
c) applying the finish layer mixture of claim 1 to said base layer;

d) allowing said finish layer mixture to harden to form a finish layer.

13. The method of claim 12 wherein said substrate is panel free.

14. The method of claim 12 wherein step d) comprises allowing said finish layer mixture to set.

15. The method of claim 12 wherein step d) further comprises floating or troweling the finish layer.

16. The method of claim 12 further comprising spreading a cushion layer onto the substrate prior to step a).

* * * * *